(No Model.)
S. H. GILSON.
COMPOSITION FOR PIPES, ARTIFICIAL STONE, &c.
No. 361,759. Patented Apr. 26, 1887.
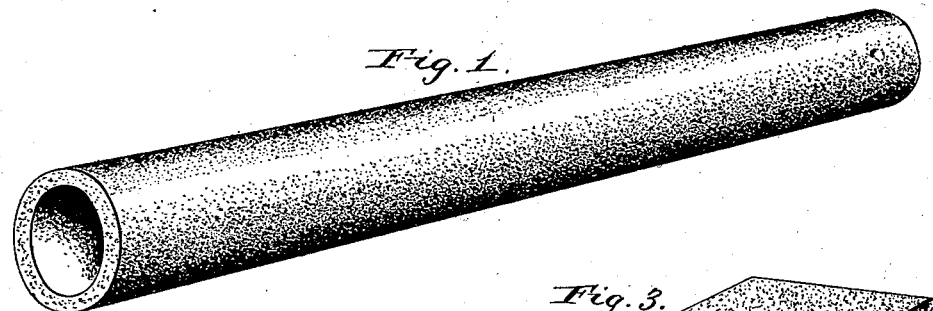
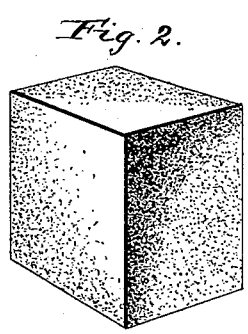
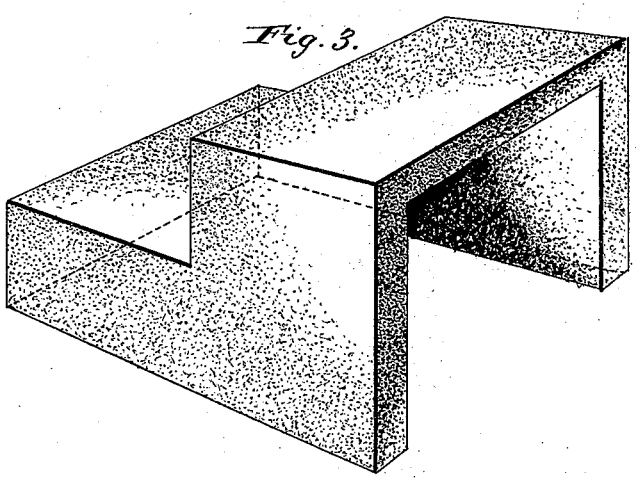
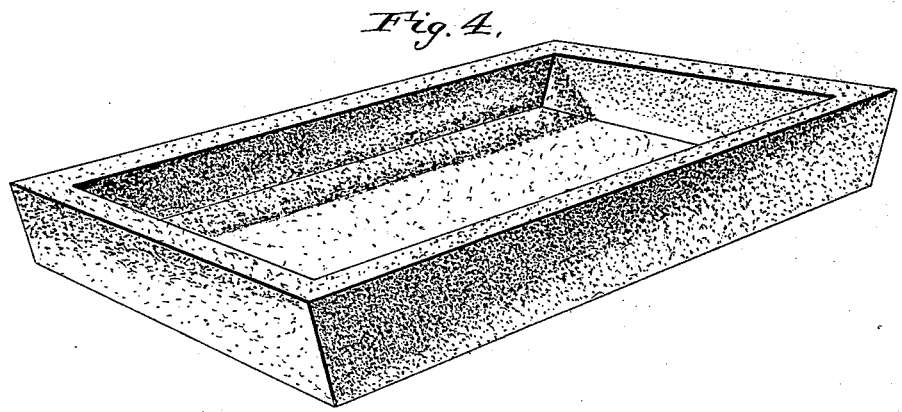
Witnesses:
C. L. Taylor,
C. E. Doyle.
Inventor:
S. H. Gilson
by J. H. Houghton.
Attorney.

UNITED STATES PATENT OFFICE.

SAMUEL H. GILSON, OF SALT LAKE CITY, UTAH TERRITORY, ASSIGNOR OF ONE-HALF TO GEORGE GOSS, SR., OF SAME PLACE.

COMPOSITION FOR PIPES, ARTIFICIAL STONE, &c.

SPECIFICATION forming part of Letters Patent No. 361,759, dated April 26, 1887.

Application filed December 10, 1885. Serial No. 185,261. (No specimens.)

*To all whom it may concern:*

Be it known that I, SAMUEL H. GILSON, a citizen of the United States, residing at Salt Lake City, in the county of Salt Lake and Territory of Utah, have invented certain new and useful Improvements in a Composition for Pipes, Artificial Stone, and other Articles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to provide a compound which is capable of being molded in plastic condition into a variety of useful forms, which will become hard, and which thereafter will be strong and very durable, being particularly impervious to and indestructible by dampness. In addition to these advantages, the compound may also be produced at comparatively small cost.

The ingredient to which the chief characteristics of the composition are due I term "gilsonite."

Gilsonite is a recently-discovered bituminous material found in Uintah county, Utah Territory, and there only, so far as I am now aware. It is in its native state black, very brittle, and easily powdered. It gives the following analysis: carbon, 78.43; hydrogen, 10.20; nitrogen, 2.27; oxygen, 8.70; ash, .40; total, 100. It is soluble as follows: Bisulphide of carbon and chloroform dissolve it completely; benzole, ninety-five per cent.; oil of turpentine, a large per cent., (not yet determined;) ether, 86.5 per cent.; absolute alcohol, 9.5 per cent. It will be noticed that it is particularly rich in hydrogen. So far as my experiments have gone, I find it practically soluble in benzole, partially soluble in turpentine and in sulphuric ether, but not practically soluble in alcohol. In various respects the substance differs from the asphalts, grahamite, albertite, or any other native bituminous material of which I have knowledge.

The other elements of my composition are sand and oil, or substances having substantially the characteristics of those substances.

In compounding the same I prefer to proceed as follows: I take fifteen parts, by weight, of gilsonite, and, having comminuted the same more or less finely, subject the same to heat in a suitable vessel, with one part of oil, till it becomes liquid. About 220° Fahrenheit I have found to suffice. Eighty-four parts of sand are then mixed with the liquid gilsonite. The one part of oil or fat is added to take away the brittleness which the compound would otherwise have when cooled. This mass, while in a heated condition, is molded into the desired form and allowed to cool. It is especially suitable for water or sewer pipes, paving-blocks, artificial stone, door-steps, vats or other vessels, underground electric conduits, and for a variety of other articles where durability and imperviousness to water are necessary and too great degree of heat is not encountered.

In the accompanying drawings I have shown a variety of articles made of my improved compound.

Figure 1 is a view of a section of water-pipe. Fig. 2 is a view of a paving-block. Fig. 3 is a view of a pair of door-steps, and Fig. 4 is a view of a vat or similar vessel.

I would mention that the proportions given above may be somewhat varied without rendering the composition incapable of the uses for which I design it; but my present knowledge indicates that the proportions given are the best.

For paving, sawdust is a valuable addition to the compound. In such case I prefer the following proportions, by weight: gilsonite, fifteen parts; oil or fat, one part; sand, forty-two parts; sawdust, forty-two parts.

Having thus described my invention, what I claim, and desire to secure by Letters Patent of the United States, is—

1. The herein-described composition for water-pipes and other articles, consisting of gilsonite and sand in substantially the proportions described.

2. The herein-described composition for water-pipes and other articles, consisting of gilsonite, sand, and oil or fat in substantially the proportions described.

3. The herein-described composition, consisting of gilsonite, sand, oil or fat, and sawdust in substantially the proportions described.

In testimony whereof I affix my signature in presence of two witnesses.

SAMUEL H. GILSON.

Witnesses:
EWELL A. DICK,
HARRY N. LOW.